United States Patent [19]

Redford

[11] Patent Number: 6,130,631

[45] Date of Patent: Oct. 10, 2000

[54] METHOD AND APPARATUS UTILIZING A SIMPLIFIED CONTENT-ADDRESSABLE MEMORY FOR JPEG DECODING

[75] Inventor: John Redford, Cambridge, Mass.

[73] Assignee: Oak Technology, Inc., Sunnyvale, Calif.

[21] Appl. No.: 09/075,603

[22] Filed: May 11, 1998

[51] Int. Cl.[7] .................................................. H03M 7/40
[52] U.S. Cl. ........................................................... 341/67
[58] Field of Search ................................... 382/245, 246; 341/65, 67

[56] References Cited

U.S. PATENT DOCUMENTS

| | | | |
|---|---|---|---|
| 5,055,841 | 10/1991 | Cordell | 341/67 |
| 5,173,695 | 12/1992 | Sun et al. | 341/67 |
| 5,181,031 | 1/1993 | Tong et al. | 341/65 |
| 5,208,593 | 5/1993 | Tong et al. | 341/65 |
| 5,254,991 | 10/1993 | Ruetz et al. | 341/65 |
| 5,381,454 | 1/1995 | Nusinov et al. | 377/39 |
| 5,475,389 | 12/1995 | Song et al. | 341/67 |
| 5,825,312 | 10/1998 | D'Ortenzio | 341/65 |

FOREIGN PATENT DOCUMENTS 0 646 932 A1  10/1994  European Pat. Off. .

OTHER PUBLICATIONS

Luthi et al. A Video–Rate JPEG Chip Set, IEEE 1992 Custom Integrated Circuits Conference pp. 26.2.1–26.2.4.

Bhaskaran et al. "Image and Video Compression Standards. Algorithms and Architectures," Kluwer Academic, Boston, MA, 1997, pp. 312–318.

Yang et al. "VLSI Architecture Design of a Versatile Variable Length Decoding Chip for Real–Time Video Codecs," Proceedings of the Region 10 conference on Computer and Communicating Systems (Tencon), Hong Kong, vol. 2, Sep. 24–27, 1990, pp. 551–554.

Nusinov et al. "High Performance Multi–Channel Data Compression Chip," Proceedings of the Custom Integrated Circuits Conference, San Diego, May 1–4, 1994, No. Conf. 16, pp. 203–206.

Patent Cooperating Treaty, International Search Report, International Application No. PCT/US99/10168, mailed on Sep. 10, 1999, 7 pages.

*Primary Examiner*—Howard L. Williams
*Attorney, Agent, or Firm*—Testa, Hurwitz & Thibeault, LLP

[57] ABSTRACT

A method and apparatus for decoding of two part binary symbols, such as JPEG symbols, is disclosed. The invention takes advantage of the relationship between the Huffman symbol length, the magnitude length, and the overall symbol length so that none of these lengths need to be stored in memory. Using the invention, a Huffman symbol can be detected. Once the symbol is detected, the invention facilitates the determination of the Huffman symbol length, the magnitude length, and the overall symbol length.

9 Claims, 8 Drawing Sheets

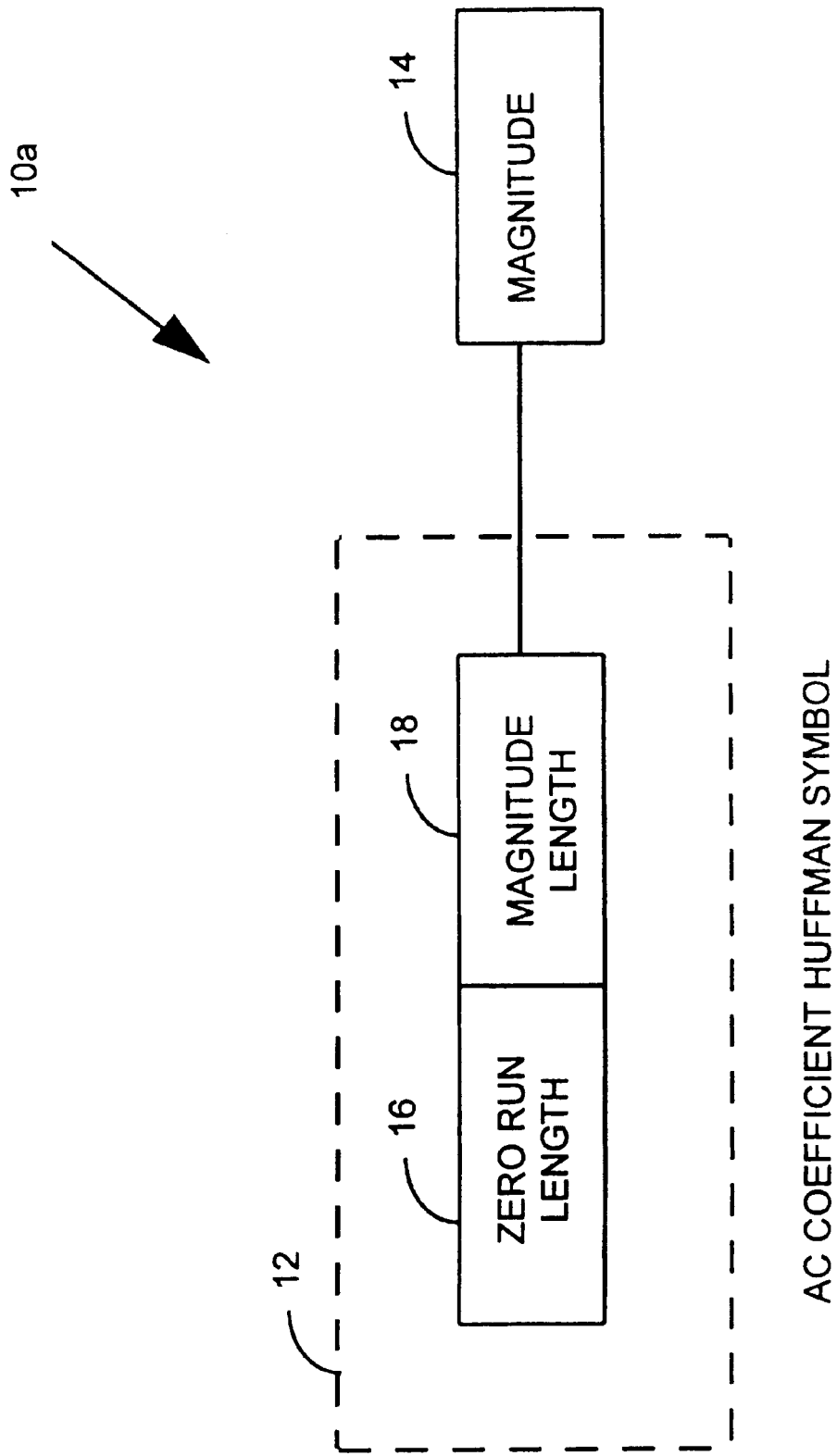

| ZERO RUN LENGTH/ MAC LENGTH | HUFFMAN SYMBOL BIT PATTERN | MASK BIT PATTERN | MATCH BIT PATTERN |
|---|---|---|---|
| 0/0 (EOB) | 1010 | 0000111111111111 | 1010111111111111 |
| 0/1 | 00 | 0011111111111111 | 0011111111111111 |
| 0/2 | 01 | 0011111111111111 | 0111111111111111 |
| 0/3 | 100 | 0001111111111111 | 1001111111111111 |
| 0/4 | 1011 | 0000111111111111 | 1011111111111111 |
| 0/5 | 11010 | 0000011111111111 | 1101011111111111 |
| 0/6 | 1111000 | 0000000111111111 | 1111000111111111 |
| 0/7 | 11111000 | 0000000011111111 | 1111100011111111 |
| 0/8 | 1111110110 | 0000000000111111 | 1111110110111111 |
| 0/9 | 1111111110000010 | 0000000000000000 | 1111111110000010 |
| 0/10 | 1111111110000011 | 0000000000000000 | 1111111110000011 |

FIG. 4

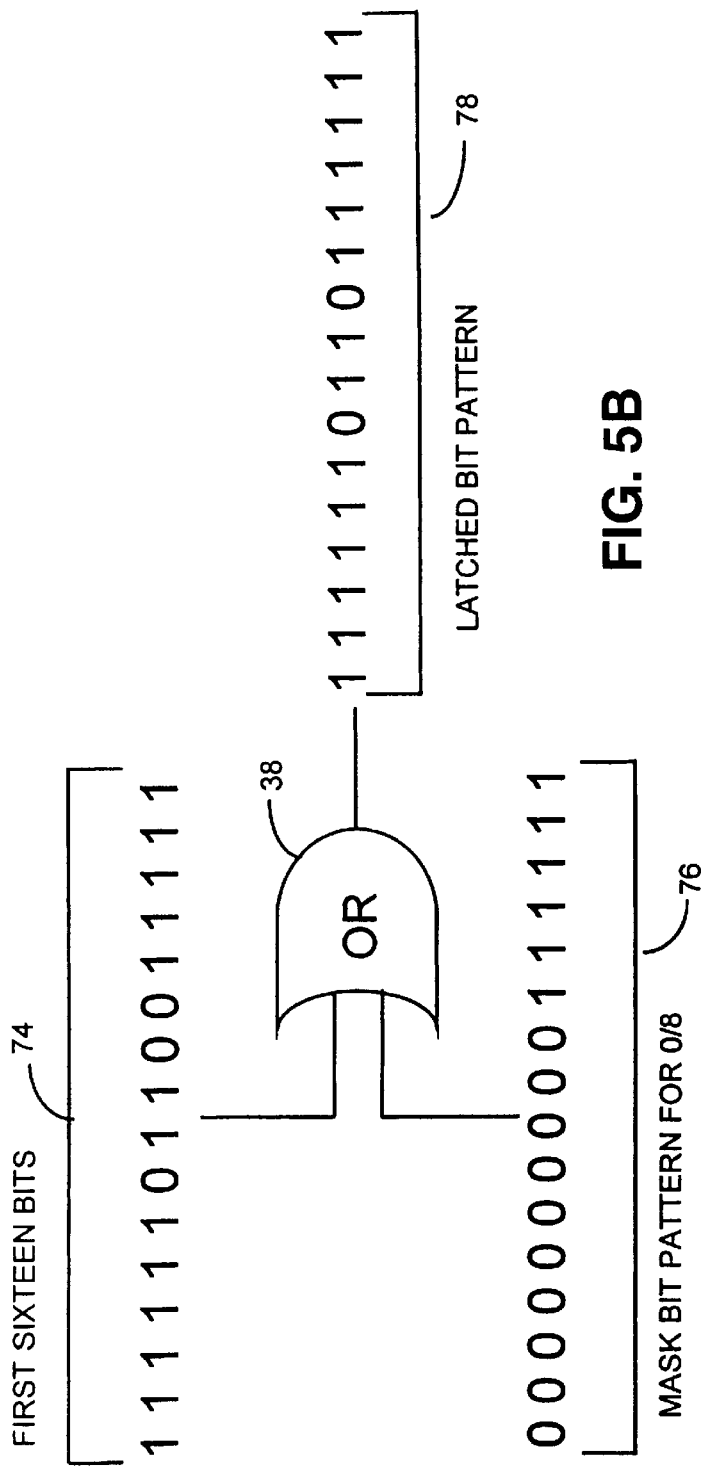
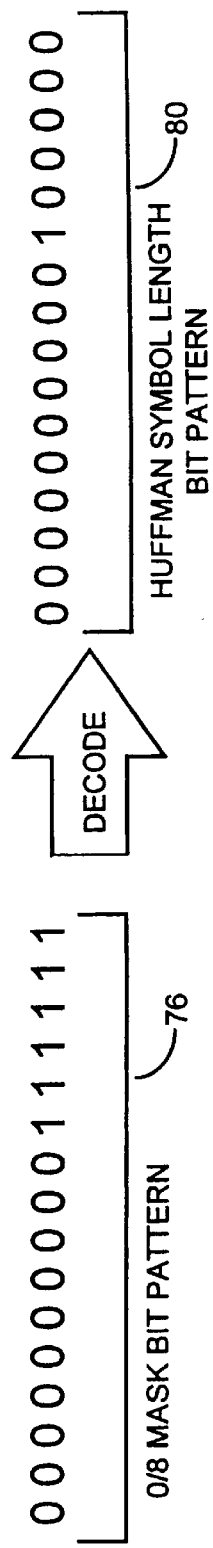
FIG. 5B
FIG. 5C

METHOD AND APPARATUS UTILIZING A SIMPLIFIED CONTENT-ADDRESSABLE MEMORY FOR JPEG DECODING

FIELD OF THE INVENTION

The invention relates generally to a method and apparatus for decoding JPEG symbols. In particular, the invention relates to a method using a content-addressable memory for increasing decoding speed and decreasing data storage requirements.

BACKGROUND OF THE INVENTION

Image compression techniques reduce the memory required for storage of large or complex images, permitting storage of images in devices with limited memory. For example, image compression techniques used in digital copiers and scanners aid in storage of complex images for subsequent printing. Similarly, image compression benefits communications where bandwidth limitations would otherwise render transmission of image data impractical. Image compression also offers substantial benefits for archiving large image libraries.

The JPEG (Joint Photographic Experts Group) standard is a set of image compression techniques that have gained widespread acceptance. The most popular of the three general compression methods defined by the JPEG standard is the baseline sequential discrete cosine transform (DCT) technique. This technique reduces the file size of grayscale and color images with a near minimum possible loss of image quality. The basic image unit for JPEG compression is the image block which includes an eight pixel by eight pixel subset of the image. Each image block is analyzed and quantized, yielding DCT coefficients representative of the image block content. The coefficients are then Huffman coded to reduce the amount of data used to characterize them.

Huffman symbols used in JPEG image compression generally combine zero run length and magnitude length information to represent the coefficients in the smallest possible number of bits. The zero run length specifies the number of consecutive zero-valued coefficients preceding a non-zero coefficient. The magnitude length specifies the bit length of that part of the JPEG symbol which represents the value of the non-zero coefficient. Huffman codes are based on a set of variable word length symbols. The number of bits used to represent a particular Huffman code should be inversely related to the probability of encountering the run-length/magnitude length represented by that code (i.e., entropy encoding).

A common way to decode bit patterns is to compare each bit pattern to a set of stored bit patterns in a content-addressable memory (CAM). Each stored bit pattern contains the bits to be matched and information about which bits are to be ignored (i.e., masked) in the comparison. If one of the stored bit patterns matches the symbol bit pattern, information necessary for the decoding of the symbol bit pattern is read out of a separate memory. The information includes the length of the Huffman part, the length of the magnitude part, and the overall JPEG symbol length. The length of the Huffman part is required for determining the start of the magnitude bits, the length of the magnitude part specifies the number of magnitude bits, and the overall symbol length is used to determine the start of the next symbol. Because the bit lengths are interrelated, separate storage of all of these lengths requires more logic circuitry and storage capacity than is desirable. In addition, retrieval and processing of the multiple bit lengths from memory requires crucial decoding time.

SUMMARY OF THE INVENTION

The present invention relates to a method and apparatus for decoding two part binary symbols such as JPEG symbols. The method takes advantage of the relationship between the Huffman symbol length, the magnitude length, and the overall symbol length to reduce the amount of data stored in memory. In particular, the magnitude length is not stored because each implementation of the method is associated with a specific magnitude length. Similarly, each apparatus is associated with a specific magnitude length. Thus, knowledge of which method implementation (or apparatus) yielded a match is sufficient to determine the magnitude length. In addition, the sum of the Huffman symbol bit length and the number of masking bits is sixteen (i.e., the maximum possible number of bits in a Huffman symbol). Thus, the Huffman symbol length is not stored because it is derived directly from the masked bit pattern of the matched CAM module.

In accordance with the present invention, only the Huffman symbol bit pattern and the mask bit pattern need to be stored in the CAM module. This saves circuitry and increases throughput over that achieved using stored information. In addition, the Huffman length and magnitude length are in a form that requires little circuitry, providing for a rapid determination of the total symbol length.

In one embodiment, the invention features a method for decoding a two part binary symbol. The two part binary symbol can be a JPEG symbol and the first part of the JPEG symbol can be a Huffman symbol. The method includes the step of logically combining a preselected number of bits from a two part binary symbol bit stream and a mask bit pattern to generate a latched bit pattern having a predetermined number of mask bits. The latched bit pattern is compared with a match bit pattern and a symbol match signal is asserted if the two bit patterns are identical. The length of the first part of the two part symbol bit pattern is determined by decoding the mask bit pattern. The mask bit pattern can be decoded by detecting the most significant non-zero bit. The length of the first part is added to a preselected constant to determine a total symbol length. The length of the first part and the overall length of the symbol are provided as outputs when the symbol match signal is generated.

In another aspect, the invention features an apparatus for decoding a two part binary symbol. The two part binary symbol can be a JPEG symbol and the first part of the JPEG symbol can be a Huffman symbol. The apparatus includes a match pattern latch, a mask pattern latch, and a processing module. The match pattern latch stores a bit pattern representing a first part of the two part binary symbol to be decoded. The mask pattern latch stores a bit pattern having non-zero values for the bits included in the second part of the two part binary symbol. A processing module communicates with the match pattern latch and the mask pattern latch. The processing module includes an input to receive the two part binary symbol and an output for indicating a two part binary symbol match if the first part of the symbol matches the bit pattern stored by the match pattern latch. The processor also includes an output for providing the bit length of the first part of the symbol and an output for providing the overall length of the symbol.

In one embodiment, the apparatus includes a set of symbol modules for decoding JPEG symbols. Each symbol module includes a processing module comprising a logic device, a comparator, a decoder, and a shifter. The logic device logically combines the JPEG symbol bit pattern and the mask bit pattern, and provides the resulting bit pattern to the comparator. The comparator compares the resulting bit pattern with the bit pattern from the match pattern latch and asserts a symbol match signal if a match is detected. The decoder receives the mask bit pattern and generates the length of the Huffman symbol. The shifter receives the length of the Huffman symbol from the decoder and adds it to the length of the magnitude part of the JPEG symbol to generate the overall JPEG symbol length.

BRIEF DESCRIPTION OF THE DRAWINGS

The foregoing and other objects, features and advantages of the invention will become apparent from the following more particular description of preferred embodiments of the invention, as illustrated in the accompanying drawings. The drawings are not necessarily to scale, emphasis instead being placed on illustrating the principles of the present invention.

FIGS. 1A and 1B are block diagrams of JPEG symbols having an AC coefficient Huffman symbol and a DC coefficient Huffman symbol, respectively.

FIGS. 4 is a table listing bit patterns used to decode AC coefficient Huffman symbols according to the present invention.

FIGS. 5A to 5C illustrate the application of method steps of the present invention to a JPEG symbol stream.

DETAILED DESCRIPTION OF THE INVENTION

Figure 1B:
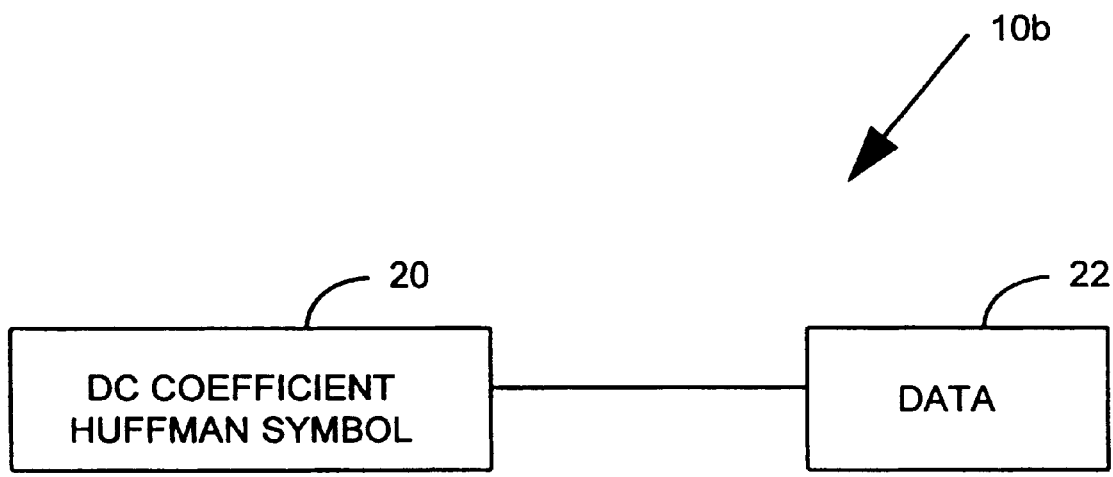

FIGS. 1A and 1B are examples of two part binary symbols that can be decoded by the method of the present invention. In FIG. 1A, a JPEG symbol 10a with AC magnitude information includes an AC coefficient Huffman symbol 12 and a magnitude part 14. The Huffman symbol 12 can be between one and sixteen bits long and the magnitude part 14 can be between zero and ten bits long. The AC coefficient Huffman symbol 12 includes information on the zero run length 16 and the magnitude length 18. The magnitude length 18 describes the number of bits in the magnitude part 14. FIG. 1B depicts a JPEG symbol 10b with DC magnitude information. The DC coefficient is always the first coefficient encountered for each image block to be compressed, thus the DC coefficient Huffman symbol 20 contains no zero run length information. Instead, the DC coefficient Huffman symbol 20 describes the number of bits in the data part 22 which can be between zero and eleven bits long. All DC coefficient Huffman symbols 20 and those AC coefficient Huffman symbols 12 having a zero-valued run length part 16 require decoding in a single decoder cycle. All other AC coefficients can be decoded in multiple decoder cycles.

Figure 2:
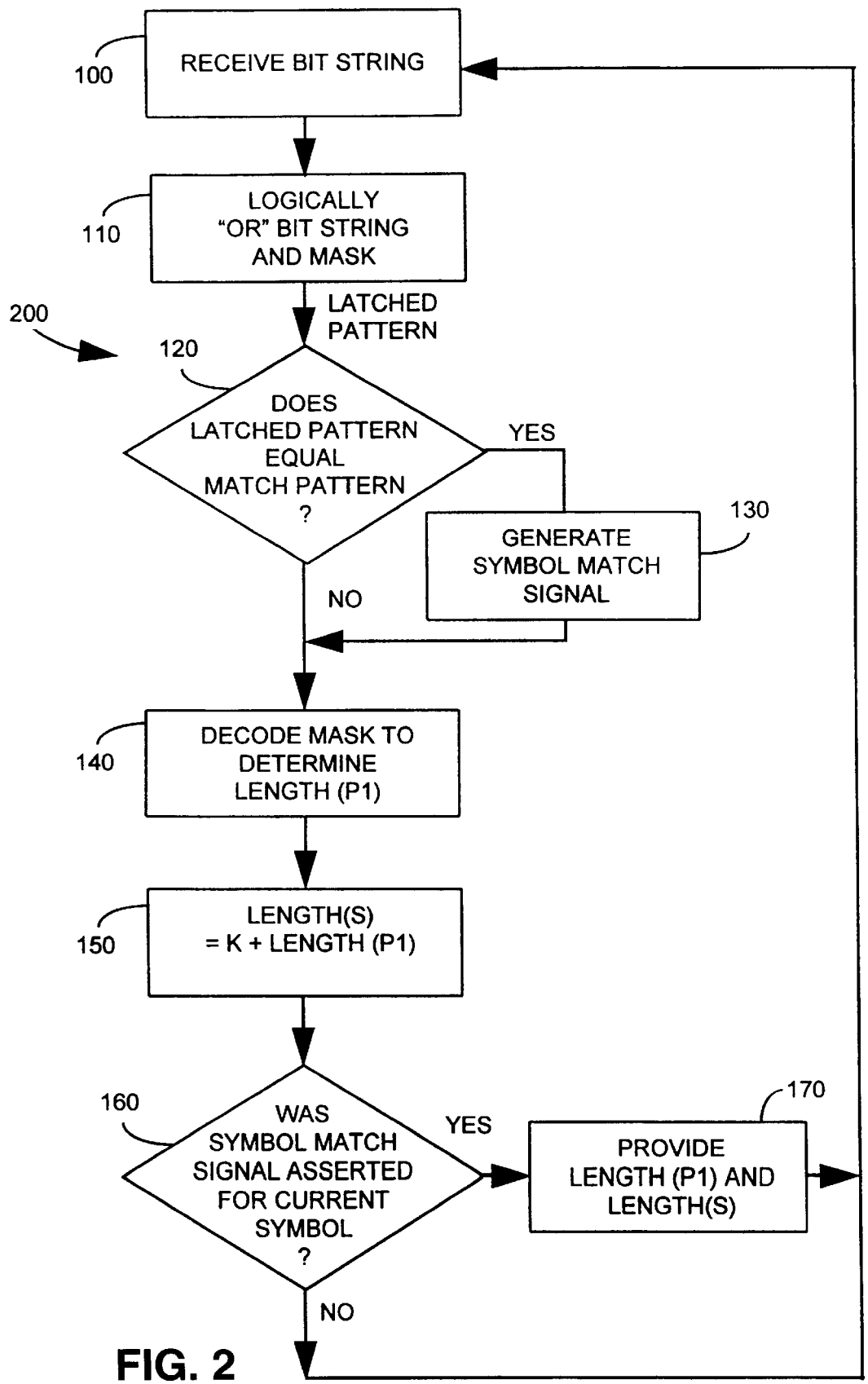
FIG. 2 is a flowchart of a method for decoding a two part binary symbol according to the present invention.

Referring to FIG. 2, a method 200 of decoding the first part of a two part symbol in a symbol stream is described as a series of steps. At step 100, a bit string including at least the first part of a two part symbol is received. The bit string can be provided from a communication device, storage medium or other source. In step 110, the bit stream is logically combined with a mask bit pattern to yield a latched bit pattern. The logical combination includes the non-exclusive ORing of the two bit patterns. The latched bit pattern is compared with the match bit pattern in step 120. If the latched bit pattern matches the match bit pattern, a symbol match signal is generated in step 130 and the mask bit pattern is decoded in step 140 to determine the bit length of the first part, LENGTH(P1), of the two part symbol. If the latched bit pattern does not match the match bit pattern, step 130 is not performed and the method proceeds with the decoding of the mask bit pattern in step 140. In step 150, the overall bit length of the two part symbol, LENGTH(S), is determined by adding the bit length of the first part of the symbol, LENGTH(P1), to a preselected constant, K. The preselected constant, K, can be the bit length of the magnitude part described by the first part of the two part symbol. Step 160 determines whether a symbol match signal has been asserted for the two part symbol. If a symbol match signal has been asserted, the bit length of the first part, LENGTH(P1), and the bit length of the overall symbol, LENGTH(S), are provided in step 170 before returning to step 100 to decode the subsequent two part symbol. If, however, no symbol match signal has been asserted for the current symbol, then the method 200 returns to step 100 to decode the subsequent two part symbol.

When any one of a set of first parts of two part symbols is to be detected, the method 200 is performed for each first part in the set. This is accomplished by using a first part bit pattern, mask bit pattern, and match bit pattern selected for each first part to be detected. Preferably, application of the method for each first part is concurrent to minimize decoding time. In one embodiment of the invention, the two part symbols are JPEG symbols. In another embodiment, the first part of the JPEG symbol is a Huffman symbol.

Figure 3:
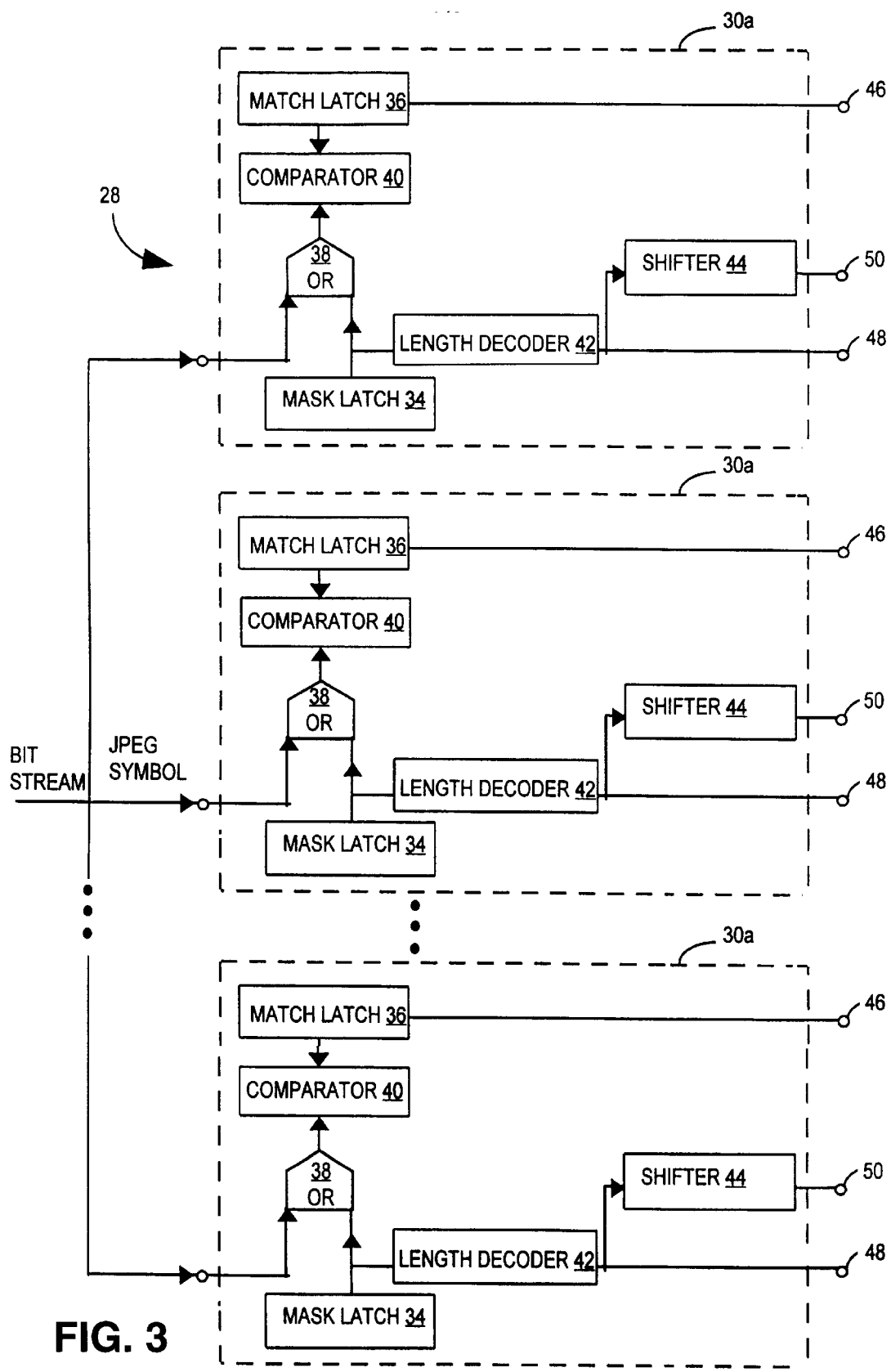
FIG. 3 is a functional block diagram of an apparatus for decoding a Huffman symbol in accordance with the present invention.

Referring to FIG. 3, a CAM decoder 28 for decoding the Huffman symbol part 12 of a JPEG symbol 10a includes a set of eleven CAM modules 30. Each CAM module 30a . . . k is adapted to detect a specific Huffman symbol 12 having a zero-valued zero run length 16. Huffman symbols 12 having non-zero valued zero run lengths 16 need not be decoded as rapidly and can be decoded using other circuitry (not shown).

Each CAM module 30 includes a mask bit pattern latch 34, a match bit pattern latch 36, a logic device 38, a comparator 40, a length decoder 42, and a shifter 44. Huffman symbols 12,20 can be up to sixteen bits long, therefore, sixteen bits are received at each CAM module input 32. The sixteen bit pattern is logically combined by the logic device 38 with a mask bit pattern stored in the mask bit pattern latch 34. The logical combining function can be a non-exclusive ORing of the corresponding bits of the sixteen bits of JPEG data and the mask bit pattern. Other logic can be used without departing from the scope of the invention. The logical combination yields a sixteen bit long latched bit pattern. The latched bit pattern is compared in comparator 40 with the sixteen bit long match bit pattern stored in the match bit pattern latch 36. A signal is asserted at symbol match output 46 if the latched bit pattern matches the match bit pattern. The length decoder 42 receives the mask bit pattern and generates a bit pattern representing the Huffman symbol bit length which is provided to the shifter 44 and the Huffman length output 48. The shifter 44 generates a bit pattern which is shifted by a number of bits at the symbol length output 50. The number of shifted bits is unique to each CAM module and corresponds to the magnitude length 18 of the Huffman symbol 12 assigned to the CAM module 30.

FIG. 4 indicates the relationship between the AC single coefficient Huffman symbol bit patterns, mask bit patterns and match bit patterns. The column labeled ZERO RUN LENGTH/MAG LENGTH identifies the eleven Huffman symbols corresponding to the eleven CAM modules 30 for decoding AC coefficient Huffman symbols 12. Each Huffman symbol 12 is identified by a first number indicating the number of zero-valued coefficients preceding the non-zero coefficient and a second number indicating the bit length of the magnitude part 14. The first number is zero for all entries in the table because only the Huffman symbols 12 corresponding to single coefficients or indicating end of block (EOB) are listed.

By way of example, Huffman symbol 0/8 can be considered exemplary of the relationships between each Huffman symbol and its tabulated bit patterns. Huffman symbol 0/8 represents a single AC coefficient and a magnitude part 14 that is eight bits long. The 0/8 Huffman symbol is represented by the ten bit long binary pattern "1111110110". Thus, the 0/8 CAM module (i.e., the CAM module used to detect the 0/8 Huffman symbol) requires that the first ten bits be examined to see if the 0/8 bit pattern is present. The last six bits can be ignored, therefore, the 0/8 CAM module includes a mask bit pattern which allows the CAM circuitry to mask (i.e., disregard) the last six bits. The mask bit pattern for Huffman symbol 0/8 is "0000000000111111". Because the mask bit pattern is non-exclusively ORed with the sixteen bits of JPEG data, the resulting latched bit pattern always has non-zero values for the bits corresponding to the non-zero valued bits in the mask bit pattern. Thus, the last six bits in the 0/8 CAM module latched pattern are "111111". If the 0/8 Huffman symbol is present, the 0/8 CAM module latched bit pattern is the ten bit long Huffman symbol bit pattern followed by six non-zero values, "1111110110111111", which is identical to the 0/8 CAM module match bit pattern.

Figure 5A:
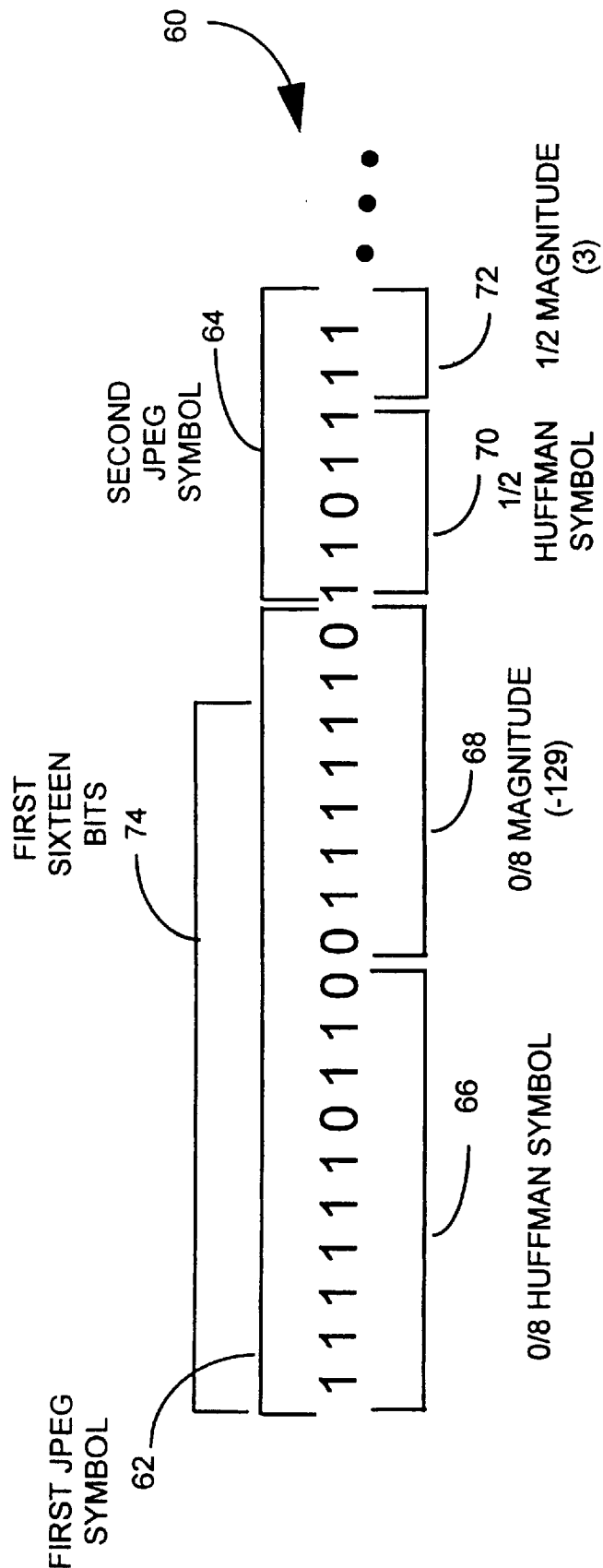

FIGS. 5A to 5C illustrate example steps used to decode a JPEG data stream 60 according to the method of the invention. In this example, the mask bit pattern and match bit pattern (not shown) correspond to the 0/8 Huffman symbol. Referring to FIG. 5A, a JPEG data stream 60 includes a first JPEG symbol 62, a second JPEG symbol 64, and additional JPEG symbols (not shown). The first JPEG symbol 62 includes a 0/8 Huffman symbol 66 followed by eight magnitude bits 68 indicating a coefficient value of −129. The second JPEG symbol 64 includes a 1/2 Huffman symbol followed by two magnitude bits 72 indicating a single zero-valued coefficient preceding a second coefficient with a value of 3.

Referring to FIG. 5B, the first sixteen bits 74 of the JPEG data stream 60 are examined to determine if the 0/8 Huffman symbol is present. This is accomplished by non-exclusively ORing in logical device 38 the first sixteen bits 74 and the mask bit pattern 76 to yield a latched bit pattern 78. The latched bit pattern 78 is then compared with the match bit pattern (not shown). In this example, the latched bit pattern 78 will match the match bit pattern indicating the presence of the 0/8 Huffman symbol.

FIG. 5C shows how the decode module 42 provides a binary-formatted bit length 80 of the decoded Huffman symbol 12. The first non-zero bit in the mask pattern 76 is detected and the other fifteen bits are set to zero. The number of zero-valued bits preceding the non-zero bit in the resulting Huffman symbol bit length pattern 80 indicates a Huffman symbol bit length of ten. The shifter 44 (not shown) shifts the Huffman symbol length bit pattern by an additional number of bits corresponding to the magnitude length 18 associated with the Huffman symbol 12 to derive the JPEG symbol bit length. In this example, the shifter 44 will shift the Huffman symbol length bit pattern 80 by eight bits corresponding to an overall JPEG symbol bit length of eighteen.

Figure 6:
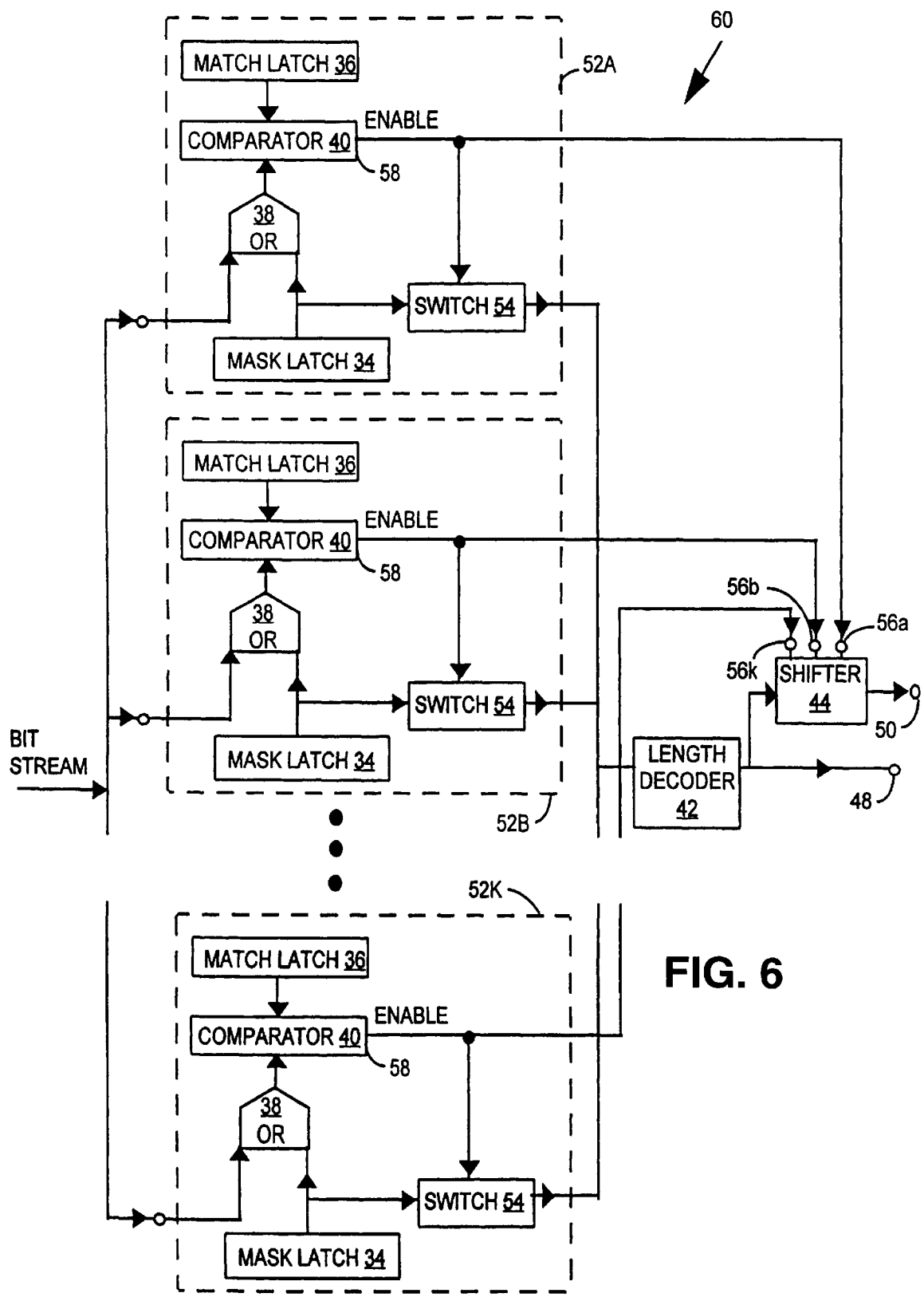
FIG. 6 is a functional block diagram of an apparatus for decoding a Huffman symbol in accordance with the present invention.

A CAM decoder 60 having multiple CAM modules 52a . . . k but only one length decoder 42 and one shifter 44 is shown in FIG. 6. Each comparator 40 has an output 58 which provides an enable signal to switch 54. The enable signal is asserted when the latched bit pattern from the logic device 38 matches the bit pattern stored in the match pattern latch 36. The enable signal activates switch 54 so that the bit pattern from the mask pattern latch 34 is received by the length decoder 42. The Huffman symbol bit length is generated by the length decoder 42 and transmitted to the shifter 44 and the Huffman length output 48.

The shifter 44 includes a series of shifter enable inputs 56a . . . k. The shifter 44 generates a bit pattern which is shifted by a constant number of bits at the symbol length output 50. The value of the constant is determined by which shifter enable input 56 is active. This CAM decoder 60 requires less circuitry than the CAM decoder 28 illustrated in FIG. 3 because only one length decoder 42 and shifter 44 is used.

Equivalents

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method for decoding a two part binary symbol comprising the steps of:

logically combining a predetermined number of bits in a bit stream and a mask bit pattern to generate a latched bit pattern having a preselected number of masked bits;

comparing the latched bit pattern with a match bit pattern;

generating a symbol match signal if the latched bit pattern matches the match bit pattern;

determining the length of the first part of the two part symbol by decoding the mask bit pattern; and adding the length of the first part of the two part symbol to a preselected constant to determine an overall length of the symbol; and providing as outputs the length of the first part and the total symbol length when the symbol match signal is generated.

2. The method of claim 1 wherein the predetermined number of bits includes the first part of a two part binary symbol.

3. The method of claim 1 wherein the determining step includes setting all non-zero bits after the first non-zero bit in the mask bit pattern to zero.

4. The method of claim 1 wherein the two part binary symbol is a JPEG symbol.

5. The method of claim 4 wherein the first part of the JPEG symbol is a Huffman symbol.

6. An apparatus for decoding a two part binary symbol comprising:

a match pattern latch for storing a bit pattern representing a first part of the two part binary symbol to be detected;

a mask pattern latch for storing a bit pattern having non-zero bits for masking bits other than the bits representing the first part of the two part symbol to be detected; and a processing module in communication with the match pattern latch and the mask pattern latch, the processing module comprising:

an input to receive a two part binary symbol bit string;

an output for indicating a two part binary symbol match if the first part of the two part binary symbol matches the match pattern latch bit pattern;

an output for providing the bit length of the first part of the two part binary symbol; and an output for providing the overall length of the two part binary symbol.

7. The apparatus of claim 6 wherein the two part binary symbol is a JPEG symbol.

8. The apparatus of claim 7 wherein the first part of the JPEG symbol is a Huffman symbol.

9. An apparatus for decoding JPEG symbols comprising a set of symbol modules, each of the set of symbol modules comprising:

an input port for receiving a JPEG symbol bit string;

a mask pattern latch for storing a mask bit pattern and having an output port for providing the mask bit pattern;

a logic device having an input port in communication with the input port of the symbol module, an input port in communication with the output port of the mask pattern latch, and an output port, the logic device performing a logical combining of a predetermined number of bits in the JPEG symbol bit string and the mask bit pattern and providing the resulting bit pattern to the logic device output port;

a match pattern latch for storing a Huffman symbol bit pattern and having an output port for providing the match pattern bit pattern;

a comparator having a first input terminal in communication with the output of the logic device, a second input terminal in communication with the output of the match pattern latch, and an output terminal, the comparator asserting a symbol match signal at the comparator output terminal if the resulting bit pattern of the logic device matches the bit pattern in the match pattern latch;

a decoder having an input port in communication with the output port of the mask pattern latch and an output port for providing the length of the Huffman symbol; and a shifter having an input in communication with the output of the decoder and an output, the shifter adding the length of a magnitude part of the matched JPEG symbol to the length of the Huffman symbol to generate the JPEG symbol length and providing the JPEG symbol length at the shifter output.

* * * * *